United States Patent

Cady et al.

[11] 3,996,985
[45] Dec. 14, 1976

[54] INFLATABLE WELL FILLER FOR PNEUMATIC TIRE AND WHEEL ASSEMBLY

[75] Inventors: John M. Cady, Munroe Falls; George T. Watts, North Canton, both of Ohio

[73] Assignee: The Goodyear Tire & Rubber Company, Akron, Ohio

[22] Filed: June 18, 1975

[21] Appl. No.: 588,100

[52] U.S. Cl. .................. 152/340; 152/330 RF; 152/381 R
[51] Int. Cl.² ................. B60C 5/08; B60C 15/02
[58] Field of Search ......... 152/158, 379, 396, 399, 152/400, 405, 381 R, 339, 340

[56] References Cited
UNITED STATES PATENTS

| | | | |
|---|---|---|---|
| 1,686,977 | 10/1928 | Littman | 152/158 |
| 1,889,799 | 12/1932 | Clark | 152/400 |
| 2,128,322 | 8/1938 | Riehl | 152/381 R |
| 2,253,746 | 8/1941 | Zimmerman | 152/339 |
| 2,399,572 | 4/1946 | Powell et al. | 152/400 |
| 2,868,259 | 1/1959 | Powers | 152/381 R |
| 3,025,902 | 3/1962 | Sanderson | 152/340 |
| 3,034,557 | 5/1962 | Beckadolph | 152/340 |

Primary Examiner—Drayton E. Hoffman
Attorney, Agent, or Firm—F. W. Brunner; H. E. Hummer

[57] ABSTRACT

A pneumatic tire and wheel assembly of the drop center type is disclosed including an inflatable annular cord-reinforced tube for filling the well of the wheel. The uninflated diameter of the cord-reinforced annular tube is substantially equal to the diameter of the base of the wheel well but expands to a diameter greater than the diameter of the bead seats upon inflation.

The foregoing abstract is not to be taken as limiting the invention of this application, and in order to understand the full nature and extent of the technical disclosure of this application, reference must be made to the accompanying drawings and the following detailed description.

5 Claims, 4 Drawing Figures

U.S. Patent   Dec. 14, 1976   3,996,985
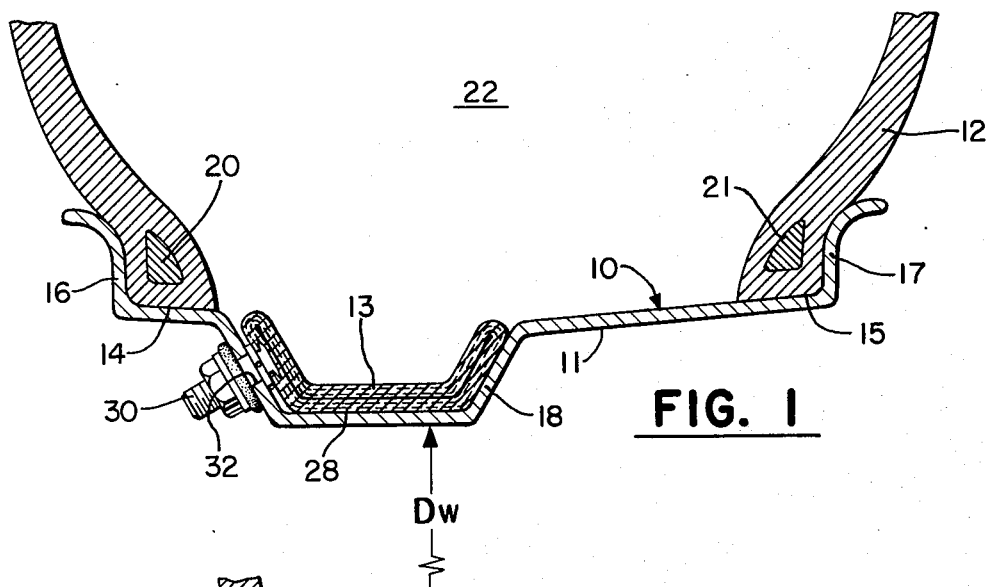
FIG. 1
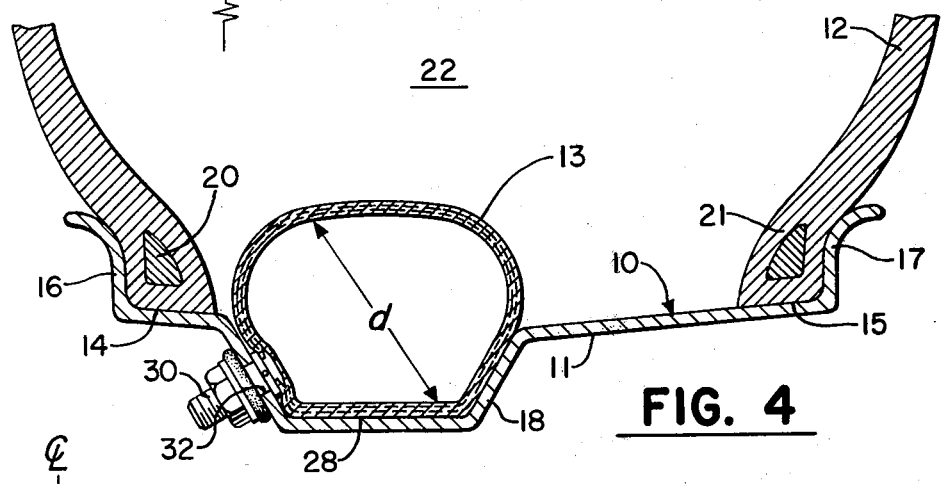
FIG. 4
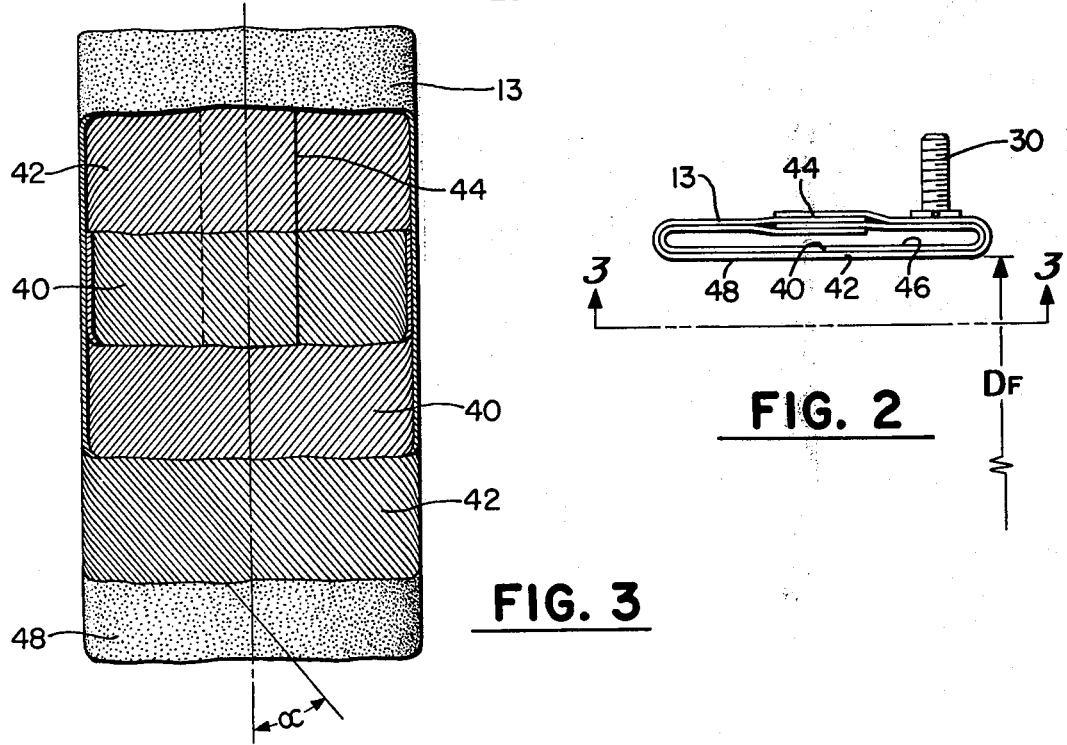
FIG. 3
FIG. 2

INFLATABLE WELL FILLER FOR PNEUMATIC TIRE AND WHEEL ASSEMBLY

This invention relates to pneumatic tire and wheel assemblies of the drop center type and, more particularly, to an inflatable means for filling the wheel well after assembly of the tire on the wheel.

More particularly, the present invention relates to a convenient means for preventing the beads of a pneumatic tire mounted on a drop center wheel from dropping into the wheel well in the event that the tire becomes deflated. In accordance with the present invention, an annular inflatable cord-reinforced tube is provided which can be stretched over the rim flange and contracted into the base of the wheel well prior to mounting of the tire on the rim. The annular tube is cord-reinforced, quite thin, and contracts tightly about the base of the wheel well, thus causing a minimum of obstruction of the wheel well and permitting mounting of the tire in a conventional manner. When the flexible, inflatable cord-reinforced tube is inflated to a pressure higher than that of the chamber pressure of the tire, the tube assumes a fairly rigid uniform torus configuration sufficient to prevent the beads of the tire from dropping into the well should there be a loss of chamber pressure in the tire.

Other objects will be in part apparent and in part pointed out more in detail hereinafter.

The invention accordingly consists in the features of construction, combination of elements and arrangement of parts which will be exemplified in the construction hereinafter set forth and the scope of the application of which will be indicated in the appended claims.

In the drawings:

FIG. 1 is a partial cross-sectional view of a tire and wheel assembly in accordance with the present invention with the annular inflatable tube shown in a deflated condition;

FIG. 2 is a cross-sectional view of the annular inflatable tube of FIG. 1, shown in the uninflated configuration prior to assembly on the wheel;

FIG. 3 is a view of the tube in FIG. 2 taken substantially along line 3—3 of FIG. 2 with portions broken away;

FIG. 4 is a cross-sectional view similar to that of FIG. 1 but illustrating the annular tube in an inflated configuration.

With reference to the drawing and in particular FIG. 1, there is illustrated a tire and wheel assembly 10 including a drop center rim 11, a pneumatic tire 12, and a wheel well filler 13. The rim 12 is of a standard drop center type and thus includes a pair of bead seats 14 and 15 each having a radially extending flange 16 and 17, respectively. Disposed adjacent the bead seat 14 is a wheel well 18 which can be of any standard configuration for facilitating the mounting of the tire 12 on the rim 17 in the well-known manner. The tire 12 includes a pair of annular inextensible bead portions 20 and 21 which are seated on the respective bead seats 14 and 15, respectively. Together, the tire 12 and rim 11 form an air chamber 22.

The wheel well filler 13 is disposed in the well 18 and contracted snugly adjacent a base surface 28 which forms the minimum radius area of the well 18. A dual valve 30 extends through a standard valve hole 32 in the rim 11. The valve 30 is of a two-way type such that the chamber of the wheel well filler 13 and the chamber 22 of the tire 12 can be separately inflated through the same valve 30. An example of such a valve is described in U.S. Pat. No. 3,191,654. It will be appreciated that it is also possible to provide separate valves for inflation of the well filler 13 and the tire chamber.

With reference to FIGS. 2 and 3, the wheel well filler 13 is illustrated in a uninflated relaxed condition prior to installation in the wheel well 18. The well filler 13 is an inflatable annular cord-reinforced tube which in the particular embodiment illustrated includes two plies of cord fabric 40 and 42 embedded in a matrix of air-impervious rubber. The filler 13 in the uninflated relaxed state has a diameter $D_F$ which is substantially equal to the diameter $D_W$ of the base surface 28 of the wheel well 18 in which it is to be installed. The diameter $D_F$ of the tube 13 as referred to herein is the diameter of the tube with respect to its rotational axis as opposed to a diameter $d$ of a section of the tube as seen in FIG. 4. It is preferable that the diameter $D_F$ of the well filler 13 not deviate substantially from the diameter $D_W$ of the base surface 28 although for passenger car tires $D_F$ can be as much as one inch greater or less than $D_W$.

In the relaxed state, the cords in both plies 40 and 42 extend at an angle of about 40 degrees with respect to a circumferential centerline of the tube but in opposite directions with respect thereto as best seen in FIG. 3.

A splice or overlap portion 44 extends circumferentially about the well filler 13 which is conveniently manufactured with the valve 30 extending radially outwardly with respect thereto. The well filler 13 can then be rolled over prior to installation on the rim 11 such that the valve 30 will protrude through the valve hole 32 in the rim.

The inflatable tube or well filler is sufficiently expandable to be pulled over the rim flange 16 or 17 and contracted into the wheel well 18 in the position as illustrated in FIG. 1. The well filler 13, however, being reinforced with bias cords will assume the configuration as illustrated in FIG. 4 when inflated. Also, the structure being so reinforced with cords can be inflated to a pressure at least as high as pressure in the tire chamber 22 and will assume a fairly rigid uniform annular configuration sufficient to resist the force of either the bead 20 or 21 of the tire 12 attempting to move into the well 18 in the event of loss of chamber pressure in the tire 12.

The cord angle of the reinforcing plies 40 and 42 has been described as being 40 degrees with respect to the centerline CL. In order to provide the proper rigid inflated configuration, this cord angle should be between 35° and 45°. Also, in order to provide a minimum thickness in the well filler 13 and thus cause a minimum amount of obstruction in the wheel well 18, the plies 40 and 42 are coated with an air-impervious rubber during the calendering operation which should be the only layers of material in the structure of the well filler exclusive of the area of the valve 30. Specifically, the cords should be of a high strength flexible material such as nylon, polyester, or aramid, and the coating of rubber should be no more than necessary to assure the desired air-impervious qualities of the tube. A thickness of twenty-five thousandths of an inch of rubber on the inner and outer surfaces 44 and 46 of the tube covering the cords has been found to be satisfactory.

Thus, the present invention has provided an inflatable wheel well filler for preventing the bead portions of a tire from dropping into the wheel well which is sufficiently expansible to be stretched over the rim flange of the wheel yet capable of being inflated to a high enough pressure to provide a firm fairly rigid structure which is capable of preventing the beads from dropping into the wheel well 18 in the event of loss of pressure in the chamber 22.

While certain representative embodiments and details have been shown for the purpose of illustrating the invention, it will be apparent to those skilled in the art that various changes and modifications may be made therein without departing from the spirit or scope of the invention.

What is claimed is:

1. A tubeless pneumatic tire and wheel assembly including: a rim of the drop center type having a wheel well with an annular base surface, a pair of bead seats, a pair of annular flanges; means, separate and unattached to the tire, for preventing the beads of said tire from dropping into said wheel well in the event of loss of pressure in the tubeless pneumatic tire, said means including a continuous annular cord-reinforced inflatable tube disposed in the wheel well and resting against the annular base surface thereof, the tube having a relaxed, uninflated diameter which is substantially equal to the diameter of the annular base surface of the wheel well, the angle of the cords being such that the tube when uninflated, can be stretched over the rim flanges and contracted tightly against the base surface of the wheel well; and means for allowing fluid, under pressure, to enter the tube and fill it to a firm torus which fills the wheel well.

2. An assembly as claimed in claim 1, wherein said annular inflatable tube is inflated to between 2-10 pounds per square inch higher than the pressure in the pneumatic tire.

3. An assembly as claimed in claim 1, wherein said annular tube is reinforced with two layers of cords extending at alternate bias angles with respect to a circumferential centerline of the tube, said bias angle being equal to between 35°–45° when the tube is in a relaxed state.

4. An assembly as claimed in claim 3, wherein said bias angle is approximately 40°.

5. An assembly as claimed in claim 4, wherein the diameter of the tube in a relaxed state is equal to within one inch of the diameter of the base of the wheel well.

* * * * *